US008091531B2

(12) United States Patent
Lucido et al.

(10) Patent No.: US 8,091,531 B2
(45) Date of Patent: Jan. 10, 2012

(54) DIAGNOSTIC SYSTEMS AND METHODS FOR A PRESSURE SENSOR DURING IDLE CONDITIONS

(75) Inventors: Michael J. Lucido, Northville, MI (US); Wenbo Wang, Novi, MI (US); Christopher R. Graham, Lake Orion, MI (US)

(73) Assignee: GM Global Technology Operations LLC

( * ) Notice: Subject to any disclaimer, the term of this patent is extended or adjusted under 35 U.S.C. 154(b) by 344 days.

(21) Appl. No.: 12/509,653

(22) Filed: Jul. 27, 2009

(65) Prior Publication Data

US 2010/0269791 A1 Oct. 28, 2010

Related U.S. Application Data

(60) Provisional application No. 61/171,556, filed on Apr. 22, 2009, provisional application No. 61/171,600, filed on Apr. 22, 2009.

(51) Int. Cl.
*F02M 57/02* (2006.01)
*G01M 15/00* (2006.01)

(52) U.S. Cl. ................. 123/446; 123/198 D; 73/114.43; 701/114

(58) Field of Classification Search .................. 123/446, 123/447, 198 D, 198 DB, 457, 458; 73/114.38, 73/114.43; 701/103, 107, 114, 115
See application file for complete search history.

(56) References Cited

U.S. PATENT DOCUMENTS

| | | | | |
|---|---|---|---|---|
| 5,983,714 | A * | 11/1999 | Izumiura et al. | 73/114.43 |
| 6,024,064 | A * | 2/2000 | Kato et al. | 123/179.17 |
| 6,076,504 | A * | 6/2000 | Stavnheim et al. | 123/447 |
| 6,578,555 | B2 * | 6/2003 | Sykes | 123/479 |
| 6,647,769 | B1 * | 11/2003 | Fujino et al. | 73/114.41 |
| 7,121,265 | B2 * | 10/2006 | Joos et al. | 123/494 |
| 7,472,690 | B2 * | 1/2009 | Takayanagi et al. | 123/446 |
| 7,556,023 | B2 * | 7/2009 | Ilhoshi et al. | 123/480 |
| 7,717,088 | B2 * | 5/2010 | Thomas | 123/478 |
| 7,765,991 | B2 * | 8/2010 | Thomas et al. | 123/520 |
| 7,891,340 | B2 * | 2/2011 | Surnilla et al. | 123/457 |
| 7,980,120 | B2 * | 7/2011 | Cinpinski et al. | 73/114.43 |
| 7,987,704 | B2 * | 8/2011 | Lucido et al. | 73/114.43 |
| 2007/0251502 | A1 * | 11/2007 | Takayanagi et al. | 123/458 |
| 2009/0205413 | A1 * | 8/2009 | Yamauchi et al. | 73/114.41 |
| 2010/0122690 | A1 * | 5/2010 | Miyake et al. | 123/457 |
| 2010/0274462 | A1 * | 10/2010 | Wang et al. | 701/102 |
| 2010/0280742 | A1 * | 11/2010 | Gwidt et al. | 701/103 |

OTHER PUBLICATIONS

U.S. Appl. No. 12/509,686, filed Jul. 27, 2009, Wenbo Wang.

* cited by examiner

*Primary Examiner* — Thomas Moulis

(57) ABSTRACT

A diagnostic system for a pressure sensor includes a fuel pump module and a diagnostic control module. The fuel pump module activates a first pump and deactivates a second pump when an engine is operating in a diagnostic mode. The first pump supplies fuel to the second pump and the second pump supplies fuel to fuel injectors of the engine via a fuel rail. The diagnostic control module receives a measured pressure signal from a pressure sensor that indicates a pressure of the fuel rail during the diagnostic mode. The diagnostic control module detects a fault of the pressure sensor based on a comparison between the measured pressure signal and the commanded pressure signal for the first pump.

20 Claims, 6 Drawing Sheets

DIAGNOSTIC SYSTEMS AND METHODS FOR A PRESSURE SENSOR DURING IDLE CONDITIONS

CROSS-REFERENCE TO RELATED APPLICATIONS

This application claims the benefit of U.S. Provisional Application No. 61/171,556, filed on Apr. 22, 2009 and U.S. Provisional Application No. 61/171,600, filed on Apr. 22, 2009. The disclosures of the above applications are incorporated herein by reference in their entirety.

FIELD

The present disclosure relates to vehicle control systems for internal combustion engines, and more particularly to diagnostic systems and methods for pressure sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A spark ignition direct injection (SIDI) system directly injects pressurized fuel into cylinders of an engine. In contrast, a port fuel injection system injects fuel into an intake manifold or port upstream from an intake valve of a cylinder. A SIDI system enables stratified fuel-charged combustion for improved fuel efficiency and reduced emissions during operation. The stratified fuel charge allows for a lean burn and improved power output.

A SIDI engine may be configured with a low-pressure fuel pump and a high-pressure fuel pump, which are used for pressurizing respectively a low-pressure fuel line and an injector fuel rail. A pressure sensor may be attached to the injector fuel rail and generate a fuel rail pressure signal. An engine control system may control the amount of fuel delivered to the cylinders based on the fuel rail pressure signal.

SUMMARY

In one embodiment, a diagnostic system is provided that includes a fuel pump module that activates a first pump and that deactivates a second pump when an engine is operating in a diagnostic mode. The first pump supplies fuel to the second pump and the second pump supplies fuel to fuel injectors of the engine via a fuel rail. A diagnostic control module receives a measured pressure signal from a pressure sensor that indicates a pressure of the fuel rail during the diagnostic mode. The diagnostic control module detects a fault of the pressure sensor based on a comparison between the measured pressure signal and the commanded pressure signal for the first pump.

In other features, a diagnostic method of diagnosing a pressure sensor is provided. The method includes activating a first pump and deactivating a second pump when an engine is operating in a diagnostic mode. Fuel is supplied to the second pump via the first pump. Fuel is supplied to fuel injectors of the engine via the second pump and using a fuel rail. A measured pressure signal is received from a pressure sensor that indicates a pressure of the fuel rail during the diagnostic mode. A fault of the pressure sensor is detected based on a comparison between the measured pressure signal and a commanded pressure signal for the first pump.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
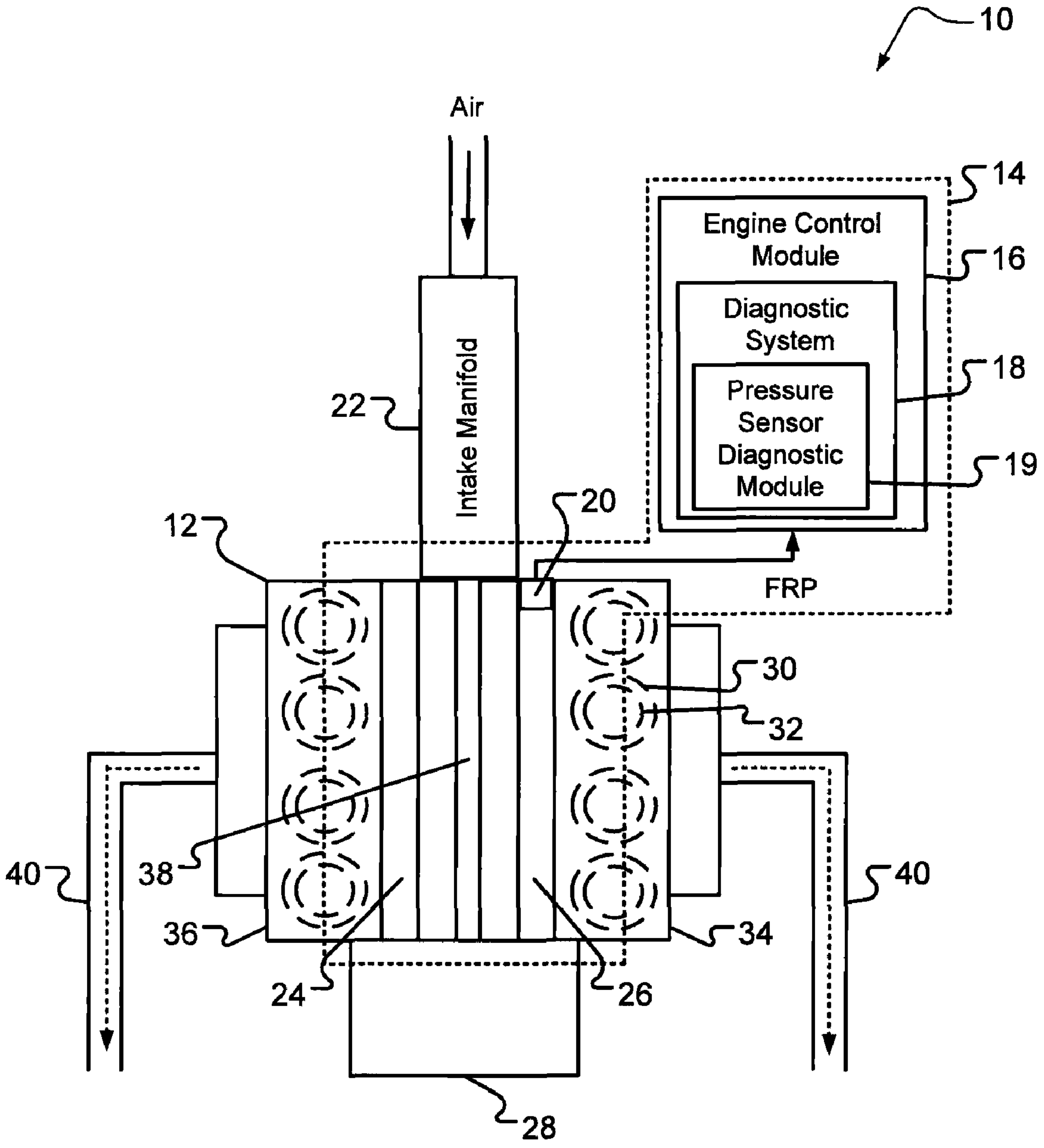
FIG. 1 is a functional block diagram of an engine system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In addition, although the following embodiments are described primarily with respect to a SIDI engine, the embodiments of the present disclosure may apply to other types of engines. For example, the present invention may apply to compression ignition, spark ignition, spark ignition direct injection, homogenous spark ignition, homogeneous charge compression ignition, stratified spark ignition, diesel, and spark assisted compression ignition engines.

An engine may include a fuel control system and an emission control system to regulate delivery of fuel to cylinders of the engine. The fuel control system and the emission control system may adjust a fuel supply pressure and/or an amount of fuel supplied to the engine based on a pressure signal from a fuel pressure sensor. The fuel pressure sensor generates the pressure signal based on a fuel pressure inside a fuel rail of the engine. The pressure signal may indicate an improper pressure value when the fuel pressure sensor is faulty. A faulty fuel pressure sensor can cause errors in the fuel control system and the emission control system.

A diagnostic trouble code (DTC) may be failed due to a fault of a fuel pressure sensor. A no trouble found (NTF) condition may occur when a diagnostic system for the fuel control system fails a DTC when a fault of a fuel pressure sensor exists. Troubleshooting NTF conditions is time consuming. The embodiments of the present disclosure provide techniques for diagnosing a fuel pressure sensor during an idle state. The idle state refers to an engine operation where the vehicle is not moving and the driver pedal is not applied. The techniques may improve air/fuel and emission control, as well as reduce the number of NTF conditions.

Referring now to FIG. 1, an exemplary engine control system 10 of a vehicle is shown. The engine control system 10 includes an engine 12 and a fuel injection system 14. The fuel injection system 14 includes an engine control module 16 with a diagnostic system 18. The diagnostic system 18 may include a pressure sensor diagnostic module 19. The pressure sensor diagnostic module 19 may detect a fault of a pressure sensor 20 while the engine 12 is operating in an idle state. The pressure sensor diagnostic module 19 may also determine a constant offset from a nominal or actual value of the pressure sensor. The pressure sensor 20 may transmit the measured pressure signal FRP to the diagnostic system 18. The diagnostic system 18 may determine the fault of the pressure sensor 20. Examples of the engine control module 16 and the diagnostic system 18 are shown in FIGS. 2 and 3.

The engine 12 includes an intake manifold 22, the fuel injection system 14 with fuel rails 24, 26, a transmission 28, a cylinder 30, and a piston 32. The exemplary engine 12 includes eight cylinders 30 configured in adjacent cylinder banks 34, 36 in a V-type layout. Although FIG. 1 depicts eight cylinders, the engine 12 may include any number of cylinders 30. The engine 12 may also have an inline-type cylinder configuration.

During engine operation, air is drawn into the intake manifold 22 by an inlet vacuum created by intake strokes of the engine 12. Fuel is directly injected by the fuel injection system 14 into the cylinders 30. The air and fuel mixes in the cylinders 30 and heat from the compression and/or electrical energy ignites the air/fuel mixture. The piston 32 in the cylinder 30 drives a crankshaft 38 of the engine 12 to produce drive torque. Combusted air/fuel mixture within the cylinder 30 is forced out through exhaust conduits 40.

Figure 2:
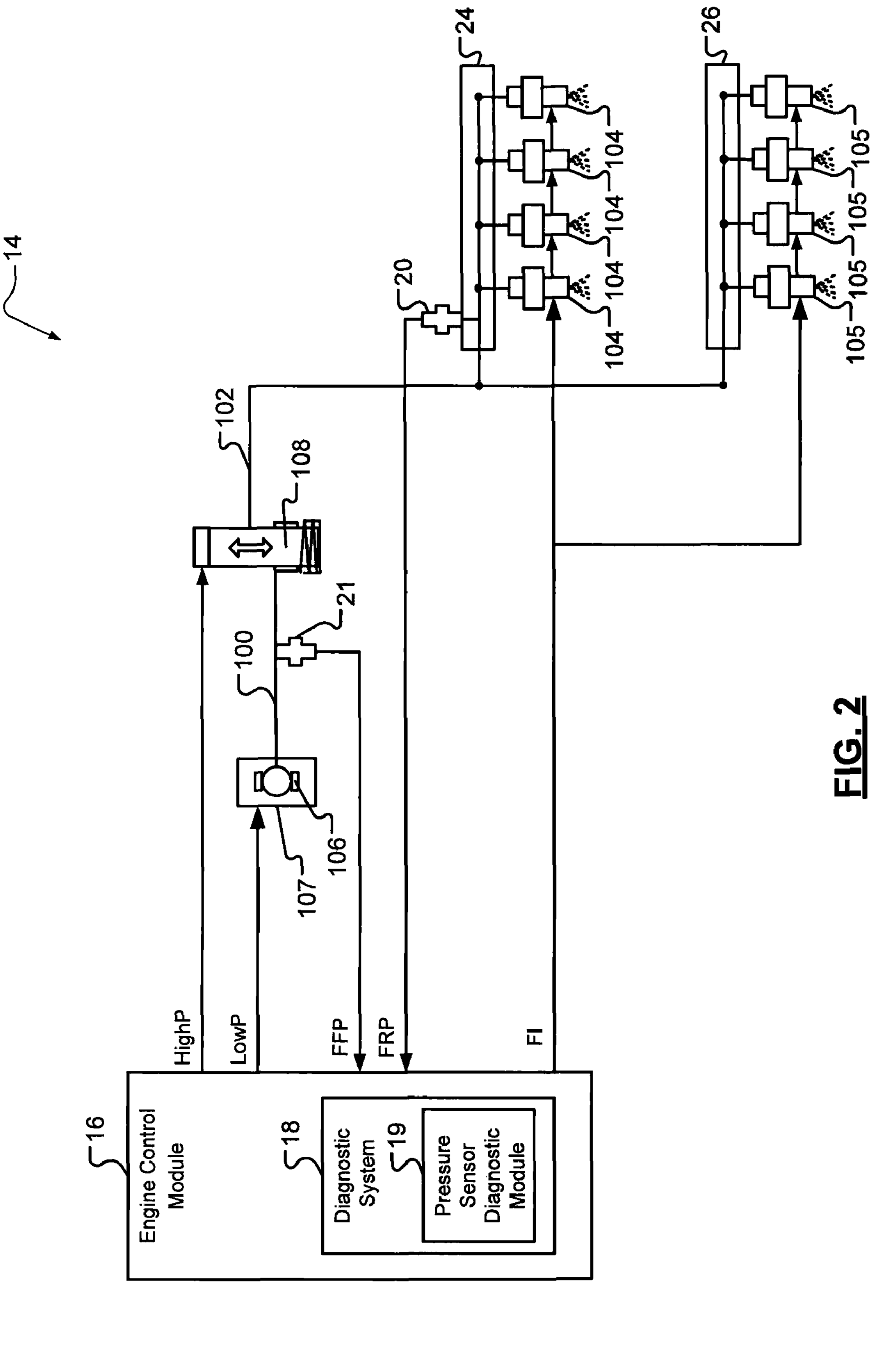
FIG. 2 is a functional block diagram of a fuel injection system in accordance with an embodiment of the present disclosure.
Figure 3:
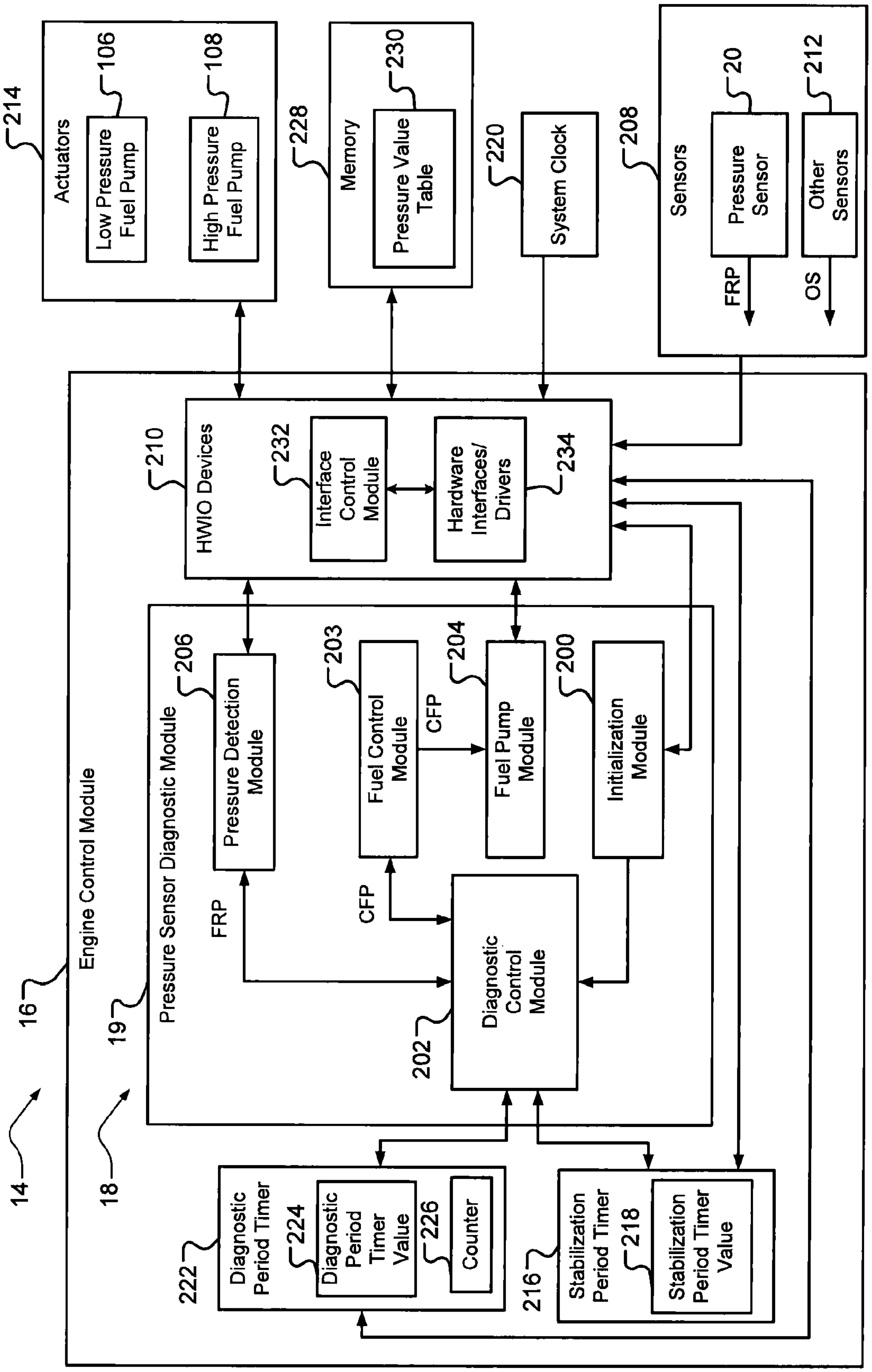
FIG. 3 is a functional block diagram of the fuel injection system of FIG. 2 illustrating a diagnostic system for a pressure sensor in accordance with an embodiment of the present disclosure.

In FIG. 2, the fuel injection system 14 is shown. The fuel injection system 14 includes the engine control module 16, the diagnostic system 18, and the pressure sensor diagnostic module 19 for the pressure sensor 20. The pressure sensor 20 may generate a measured pressure signal FRP to indicate a fuel pressure of a high-pressure fuel line 102. A low-pressure fuel line 100 and the high-pressure fuel line 102 are connected to the fuel rails 24, 26, and fuel injectors 104, 105. The low-pressure fuel line 100 may include a fuel feed pressure sensor 21. The fuel feed pressure sensor 21 may generate a fuel feed pressure signal FFP to indicate a predetermined fuel feed pressure of the low-pressure fuel line 100. The fuel lines 100, 102 receive fuel by a respective one of a low-pressure fuel pump 106 and a high-pressure fuel pump 108. The fuel feed pressure signal FFP and the measured pressure signal FRP may be the same when the high-pressure fuel pump 108 is deactivated for diagnosis of the pressure sensor 20.

The low-pressure fuel pump 106 located in a fuel tank 107 may operate off of an electrical power source, such as a battery. The high-pressure fuel pump 108 may operate off of the engine 12. The high-pressure fuel pump 108 provides a higher fuel pressure than and/or increases a fuel pressure provided by the low-pressure fuel pump 106. The low-pressure fuel pump 106 may provide a fuel pressure of, for example, 400 kilopascal (kPa=$10^3$ Pa)±50 kPa. The high-pressure fuel pump 108 may provide a fuel pressure of, for example, 15 megapascal (mPa=$10^6$ Pa)±1 mPa.

In use, the engine control module 16 generates a low-pressure control signal LowP to pump fuel from the fuel tank 107 to the low-pressure fuel line 100 via the low-pressure fuel pump 106. The engine control module 16 generates a high-pressure control signal HighP to pump fuel into the high-pressure fuel line 102 and the fuel rails 24, 26. The high-pressure fuel pump 108 is used to increase pressure of the fuel received from the low-pressure fuel line 100. High-pressured fuel is provided to the high-pressure fuel line 102 and the fuel rails 24, 26. The high-pressured fuel is injected into the cylinders 30 via the fuel injectors 104, 105. Timing of the fuel injectors 104, 105 is controlled by the engine control module 16. Although a particular number of fuel rails and fuel injectors per fuel rail are shown, any number of fuel rails and corresponding fuel injectors may be included.

The engine control module 16 controls the fuel pumps 106, 108 in response to various sensor inputs, such as a measured pressure signal FRP from the pressure sensor 20. Pressure sensors may be connected to and detect pressure in one or more of the high-pressure fuel line 102 and fuel rails 24, 26. The pressure sensor 20 is shown as one example. The engine control module 16 may generate various control signals, such as the low-pressure control signal LowP, the high-pressure control signal HighP, and a fuel injector control signal FI. The fuel injector control signal FI may be used to control opening and closing of the fuel injectors 104, 105.

Fuel is stored in the fuel tank 107. The engine control module 16 may transmit the low-pressure control signal LowP to the low-pressure fuel pump 106. The low-pressure fuel pump 106 pumps fuel from the fuel tank 107 via the low-pressure fuel line 100. The engine control module 16 may transmit the high-pressure control signal HighP to the high-pressure fuel pump 108. The high-pressure fuel pump 108 pressurizes fuel for delivery to the fuel injectors 104, 105, via the high-pressure fuel line 102 that is connected to the fuel rails 24, 26.

Referring now also to FIG. 3, the fuel injection system 14 with the engine control module 16 illustrating the diagnostic system 18 for the pressure sensor 20 is shown. The diagnostic system 18 may include the pressure sensor diagnostic module 19. The pressure sensor diagnostic module 19 may include an initialization module 200, a diagnostic control module 202, a fuel control module 203, a fuel pump module 204, and a pressure detection module 206.

The initialization module 200 may receive signals from sensors 208 via hardware input/output (HWIO) devices 210. The sensors 208 may include the pressure sensor 20, and other sensors 212. The other sensors 212 may include an engine speed sensor, an intake air temperature (IAT) sensor, a humidity sensor, and/or an oxygen sensor. The initialization module 200 may generate an initialization signal when the engine 12 has operated in the idle state for a predetermined period. The initialization module 200 may transmit the initialization signal to the diagnostic control module 202, indicating the engine 12 is operating in a diagnostic mode.

The diagnostic control module 202 receives the initialization signal and enables the fuel control module 203. The fuel control module 203 signals the fuel pump module 204 to operate actuators 214 via the HWIO devices 210. The actuators 214 may include the low-pressure fuel pump 106 and the high-pressure fuel pump 108. The fuel control module 203 generates a commanded pressure signal CFP for the low-pressure fuel pump 106 to apply a predetermined fuel feed pressure to the low-pressure fuel line 100. The fuel control module 203 transmits the commanded pressure signal CFP to the diagnostic control module 202 and the fuel pump module 204.

The fuel pump module 204 increases an output pressure of the low-pressure fuel pump 106 based on the commanded pressure signal CFP. The diagnostic control module 202 activates a stabilization period timer 216. The stabilization period timer 216 may include a stabilization period timer value 218. The stabilization period timer 216 measures time spent to stabilize fuel pressures in the low-pressure fuel line 100, the high-pressure fuel line 102, and the fuel rails 24, 26. The stabilization period timer 216 increases the stabilization period timer value 218 based on a clock signal received from a system clock 220 via the HWIO devices 210. When the stabilization period timer value 218 is greater than a predetermined period, the diagnostic control module 202 enables the pressure detection module 206.

The pressure detection module 206 generates and transmits a measured pressure signal FRP from the pressure sensor 20 to the diagnostic control module 202. The diagnostic control module 202 activates a diagnostic period timer 222. The diagnostic period timer 222 may include a diagnostic period timer value 224. The diagnostic period timer 222 measures time spent to diagnose the pressure sensor 20. The diagnostic control module 202 calculates a pressure difference ΔP between the commanded pressure signal CFP and the measured pressure signal FRP. A set of the pressure differences ΔP may be stored in memory 228. A pressure value table 230 in the memory 228 may be used to store the set of the pressure differences ΔP for a predetermined diagnostic period.

The HWIO devices 210 may include an interface control module 232 and hardware interfaces/drivers 234. The interface control module 232 provides an interface between the modules 200, 202, 204, 206, and the hardware interfaces/drivers 234. The hardware interfaces/drivers 234 control operation of, for example, fuel pumps 106, 108, and other engine system devices. The other engine system devices may include ignition coils, spark plugs, throttle valves, solenoids, etc. The hardware interface/drivers 234 also receive sensor signals, which are communicated to the respective control modules. The sensor signals may include the measured pressure signal FRP from the pressure sensor 20 and signals OS from other sensors 212.

Figure 4A:
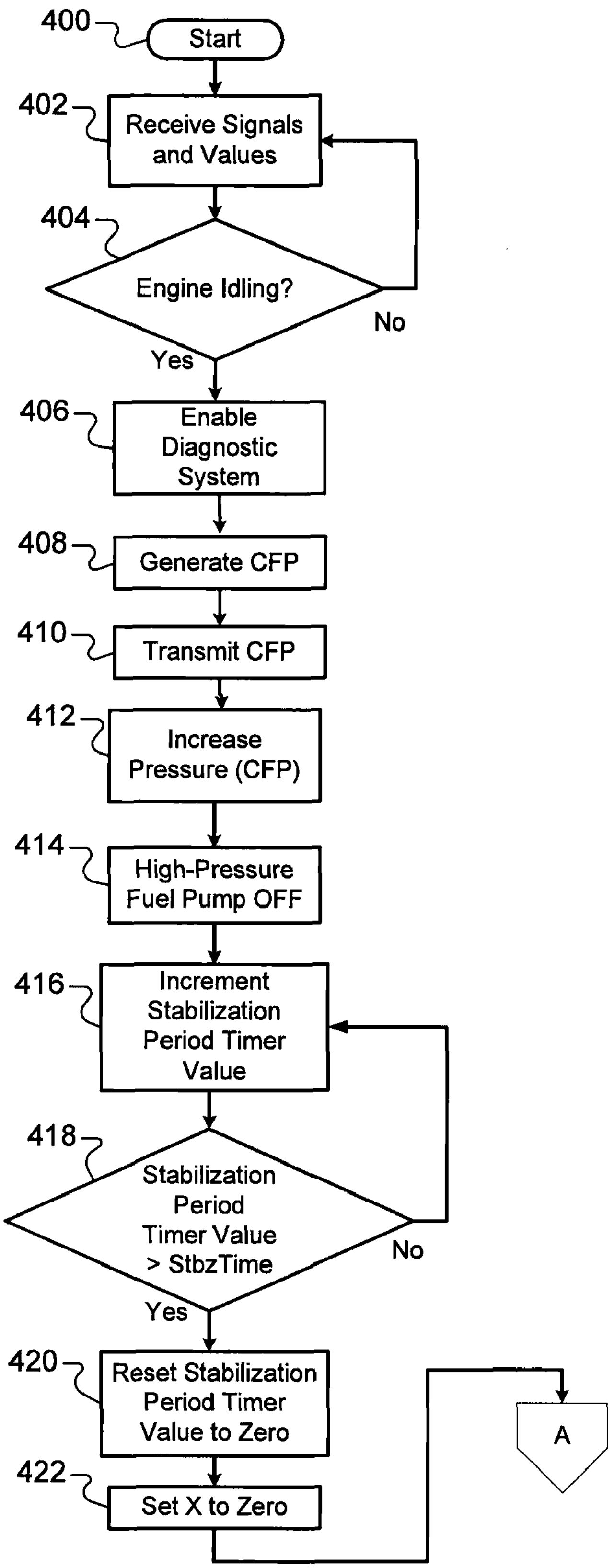
FIGS. 4A and 4B illustrate a method of diagnosing a pressure sensor in accordance with an embodiment of the present disclosure.
Figure 4B:
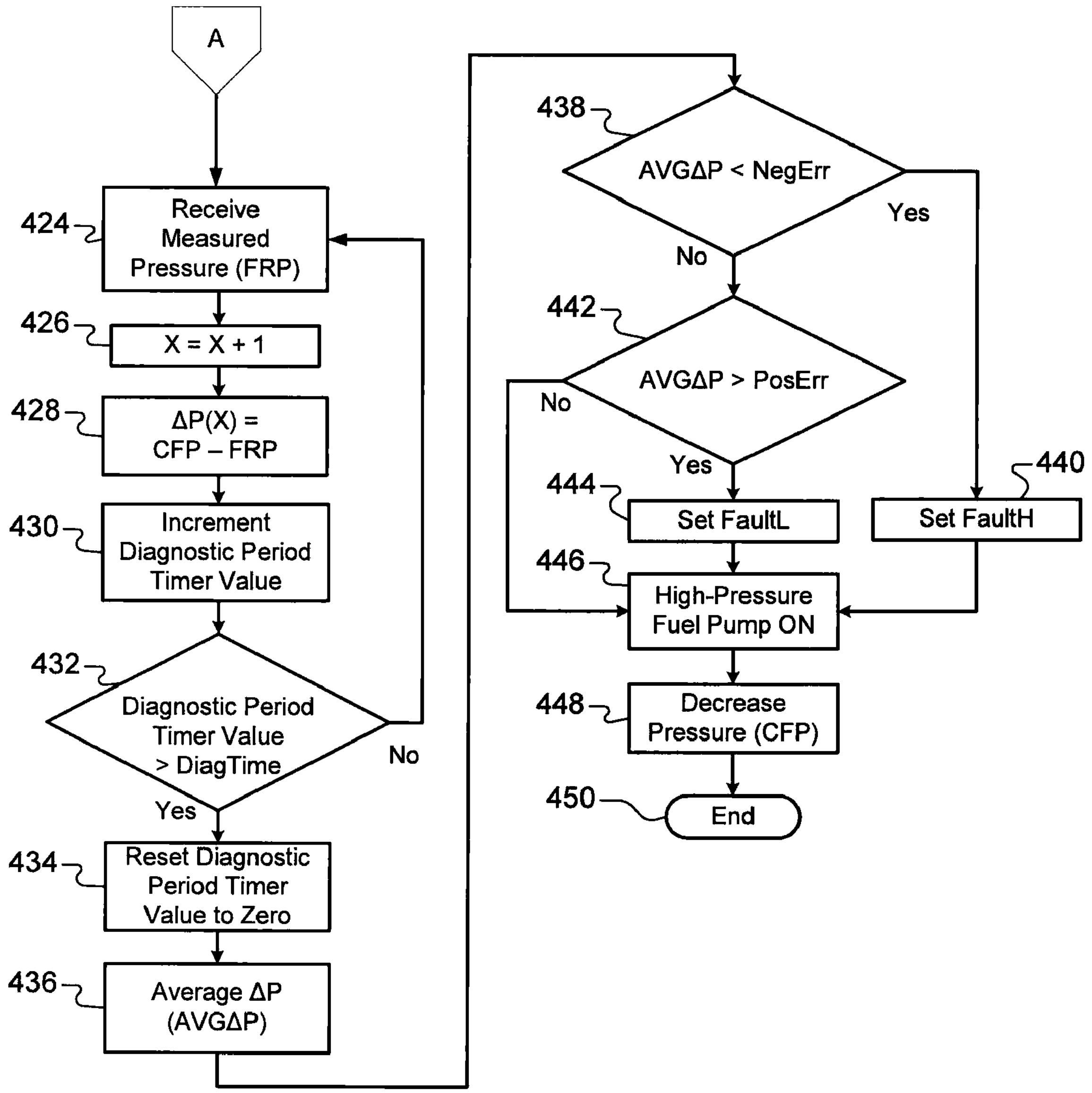

Referring now also to FIG. 4, a method of diagnosing a pressure sensor 20 is shown. Although the following steps are primarily described with respect to the embodiments of FIGS. 1-3, the steps may be modified to apply to other embodiments of the present invention.

The method may begin at step 400. In step 402, signals from the sensors 208 and values in the memory 228 may be received and/or generated. The signals may include the measured pressure signal FRP from the pressure sensor 20. The signals may be transmitted to modules, such as the initialization module 200, the diagnostic control module 202, the fuel pump module 204, and the pressure detection module 206 via the HWIO devices 210.

In step 404, when the engine 12 has operated in an idle state for a predetermined period, the initialization module 200 generates and transmits an initialization signal to the diagnostic control module 202. Otherwise, control may return to step 402. In step 406, the diagnostic control module 202 enables the fuel control module 203 of the diagnostic system 18. In step 408, the fuel control module 203 generates a commanded pressure signal CFP for the low-pressure pump that is equal to or within a predetermined range of a maximum capacity of the low pressure pump. This prevents fueling errors in the system.

Figure 5:
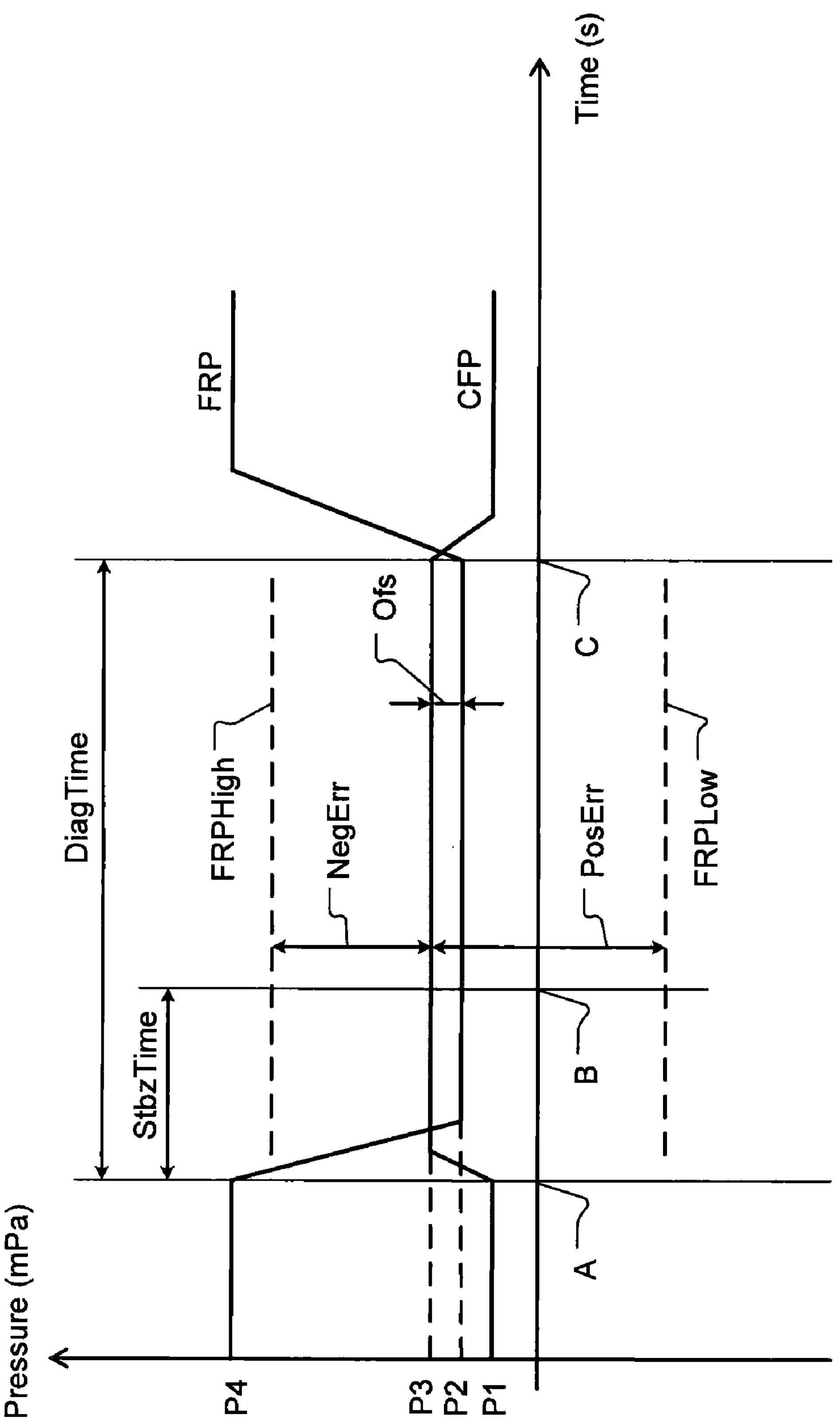
FIG. 5 is an exemplary plot of fuel pressure signals in accordance with the embodiment of FIG. 3.

Referring now also to FIG. 5, an exemplary plot of fuel pressure signals in accordance with the embodiment of FIG. 3 is shown. The measured pressure signal FRP shown in FIG. 5 is an example pressure signal of a non-faulty pressure sensor or an example of when the pressure sensor 20 is operating in a non-faulty state. The measured pressure signals FRPHigh, FRPLow are examples of faulty pressure signals of a faulty pressure sensor and/or are examples of when the pressure sensor 20 is operating in a faulty state. During an example or normal idle state of the engine 12 when the pressure sensor 20 is in a non-faulty state, the commanded pressure signal CFP may be equal to a first pressure P1 (e.g. 0.3 mPa) and the measured pressure signal FRP may be equal to a fourth pressure P4 (e.g. 2 mPa).

In step 410, the fuel control module 203 transmits the commanded pressure signal CFP to the diagnostic control module 202 and the fuel pump module 204. In step 412, the fuel pump module 204 commands the low-pressure fuel pump 106 to increase fuel pressure in the low-pressure fuel line 100 to a predetermined feed pressure (e.g. 500 kPa). The predetermined feed pressure may be calibrated and stored in the memory 228. For example, the fuel pump module 204 commands the low-pressure fuel pump 106 to increase the commanded pressure signal CFP from the first pressure P1 (e.g. 0.3 mPa) to a third pressure P3 (e.g. 0.5 mPa). In step 414, the fuel control module 203 signals the fuel pump module 204 to deactivate the high-pressure fuel pump 108 for diagnosis of the pressure sensor 20.

In step 416, the diagnostic control module 202 activates the stabilization period timer 216 to wait for a predetermined amount of time for stabilizing fuel pressure in the low-pressure fuel line 100, the high-pressure fuel line 102, and the fuel rails 24, 26. For example, the stabilization period timer 216 accesses the system clock 220 via the HWIO devices 210 to receive an initial timestamp of when the commanded pressure signal CFP is increased. The stabilization period timer 216 compares the initial timestamp with a current timestamp based on a clock signal received from the system clock 220. The stabilization period timer 216 increases the stabilization period timer value 218 based on a time difference between the timestamps.

In step 418, when the stabilization period timer value 218 is greater than a predetermined stabilization period StbzTime, control may proceed to step 420. Otherwise, control may return to step 416. The stabilization period timer value 218 is compared to the predetermined stabilization period StbzTime. For example, in FIG. 5, point A refers to a start time of the stabilization period StbzTime when the commanded pressure signal CFP is increased by the fuel pump module 204. Point B refers to an end time of the stabilization period StbzTime. The predetermined stabilization period StbzTime from point A to point B represents an amount of time to allow fuel pressures in the low-pressure and high-pressure fuel lines 100, 102, and the fuel rails 24, 26, to be stabilized.

In step 420, after the predetermined stabilization period StbzTime, the stabilization period timer 216 resets the stabilization period timer value 218 to zero. In step 422, the counter 226 of the diagnostic period timer 222 sets an index X to zero. X is an integer from zero to K, where K represents a number of pressure differences ΔP(X) stored in the pressure value table 230. The diagnostic control module 202 calculates and stores the pressure differences ΔP(X) between the commanded pressure signal CFP and a measured pressure signal FRP. The measured pressure signal FRP represents a non-faulty pressure signal that is equal to or less than the commanded pressure signal CFP due to the deactivation of the high-pressure fuel pump 108. The measured pressure signal FRP may be within a predetermined range of the commanded pressure signal CFP.

The pressure differences ΔP(X) may be calculated during a predetermined diagnostic period DiagTime. Point B also refers to a start time of the predetermined diagnostic period DiagTime. Point C refers to an end time of the predetermined diagnostic period DiagTime. Between points A and B, the measured pressure signal FRP may decrease from the fourth pressure P4 (e.g. 2 mPa) to a second pressure P2 (e.g. 0.4 mPa) due to deactivation of the high-pressure fuel pump 108. An offset Ofs between P3 and P2 is caused by a fuel flow friction or restriction across the high-pressure fuel pump 108 and the low-pressure and high-pressure fuel lines 100, 102.

In step 424, the pressure detection module 206 receives a fuel rail pressure signal from the pressure sensor 20 via the HWIO devices 210 to generate the measured pressure signal FRP. The measured pressure signal FRP may be one of the faulty pressure signals FRPHigh, FRPLow. In step 426, the counter 226 of the diagnostic period timer 222 increments the index X by one. In step 428, the pressure detection module 206 transmits the measured pressure signal FRP to the diagnostic control module 202. The diagnostic control module 202 calculates the pressure difference ΔP(X) between the commanded pressure signal CFP and the measured pressure signal FRP. The diagnostic control module 202 may determine the pressure difference ΔP(X) by subtracting the measured pressure signal FRP from the commanded pressure signal CFP. The pressure difference ΔP(X) may be stored in the pressure value table 230 of the memory 228. The pressure value table 230 is updated by the diagnostic control module 202 during the predetermined diagnostic period DiagTime.

In step 430, the diagnostic control module 202 activates the diagnostic period timer 222. The diagnostic period timer 222 accesses the system clock 220 via the HWIO devices 210 to receive an initial timestamp of, for example, when the commanded pressure signal CFP is increased. The diagnostic period timer 222 compares the initial timestamp with a current timestamp based on a clock signal received from the system clock 220. The diagnostic period timer 222 increases the diagnostic period timer value 224 based on a time difference between the timestamps.

In step 432, when the diagnostic period timer value 224 is greater than the predetermined diagnostic period DiagTime, control may proceed to step 434. Otherwise, control may return to step 424. In step 434, after the predetermined diagnostic period DiagTime, the diagnostic period timer 222 resets the diagnostic period timer value 224 to zero. In step 436, the diagnostic control module 202 accesses the pressure value table 230 to generate an average pressure AVGΔP of the pressure differences ΔP(X) stored during the predetermined diagnostic period DiagTime. The diagnostic control module 202 calculates the average pressure AVGΔP of the pressure differences ΔP(X). For example, the average pressure AVGΔP may be determined based on a sum of the pressure differences. For example only, the average pressure AVGΔP may be defined as provided by expression 1.

$$AVG\Delta P = \sum_{x=1}^{K} \frac{\Delta P(x)}{K} \quad (1)$$

X identifies a particular pressure difference and ΔP(X) is the pressure difference.

In step 438, when the average pressure AVGΔP is less than a predetermined negative offset NegErr, control may proceed to step 440. Otherwise, control may proceed to step 442. For example, as shown in FIG. 5, a first average pressure may be an average value of pressure differences ΔP(X) between the commanded pressure signal CFP and a first measured pressure signal FRPHigh. The pressure difference may be determined by subtracting the first measured pressure signal FRPHigh from the commanded pressure signal CFP.

Because the first measured pressure signal FRPHigh is greater than the commanded pressure signal CFP, the first average pressure is a negative number. When the first average pressure is less than the predetermined negative offset NegErr, a DTC may be set to indicate a fault of the pressure sensor 20. In step 440, the diagnostic control module 202 may generate a DTC FaultH. The DTC FaultH indicates that the pressure sensor 20 is generating a measured pressure signal that is greater than a nominal or actual value. The absolute value of the predetermined negative offset NegErr is also greater than the offset value Ofs.

In step 442, when the average pressure AVGΔP is greater than a predetermined positive offset PosErr, control may proceed to step 444. Otherwise, control may proceed to step 446. For example, as shown in FIG. 5, a second average pressure may be an average value of pressure differences ΔP(X) between the commanded pressure signal CFP and a second measured pressure signal FRPLow. The pressure difference may be determined by subtracting the second measured pressure signal FRPLow from the commanded pressure signal CFP.

Because the second measured pressure signal FRPLow is less than the commanded pressure signal CFP, the second average pressure is a positive number. When the second average pressure is greater than the predetermined positive offset PosErr, a DTC may be set to indicate a fault of the pressure sensor 20. In step 444, the diagnostic control module 202 may generate a DTC FaultL. The DTC FaultL indicates that the pressure sensor 20 is generating a measured pressure signal that is less than a nominal or actual value. The absolute value of the predetermined positive offset PosErr is also greater than the offset value Ofs.

The first and second measured pressure signals FRPHigh, FRPLow are examples of faulty pressure signals of a faulty pressure sensor and/or are examples of when the pressure sensor 20 is operating in a faulty state. The measured pressure signal FRP may be one of two faulty pressure signals FRPHigh, FRPLow. Step 438 applies when the measured pressure signal FRP is the first measured pressure signal FRPHigh. Step 442 applies when the measured pressure signal FRP is the second measured pressure signal FRPLow.

In step 446, the fuel pump module 204 reactivates the high-pressure fuel pump 108. For example, after the reactivation of the high-pressure fuel pump 108 at point C, the measured pressure signal FRP may increase from the second pressure P2 (e.g. 0.4 mPa) to the fourth pressure P4 (e.g. 2 mPa). In step 448, the fuel pump module 204 commands the low-pressure fuel pump 106 to decrease fuel pressure in the low-pressure fuel line 100 to the predetermined feed pressure (e.g. 300 kPa). For example, at point C, the fuel pump module 204 commands the low-pressure fuel pump 106 to decrease the commanded pressure signal CFP. The commanded pressure signal CFP may decrease from the third pressure P3 (e.g. 0.5 mPa) to the first pressure P1 (e.g. 0.3 mPa). Control may end at step 450.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system comprising:
a fuel pump module that activates a first pump and that deactivates a second pump when an engine is operating in a diagnostic mode,
wherein the first pump supplies fuel to the second pump and the second pump supplies fuel to fuel injectors of the engine via a fuel rail; and
a diagnostic control module that receives a measured pressure signal from a pressure sensor that indicates a pressure of the fuel rail during the diagnostic mode,
wherein the diagnostic control module detects a fault of the pressure sensor based on a comparison between the measured pressure signal and a commanded pressure signal for the first pump.

2. The diagnostic system of claim 1, wherein the commanded pressure signal is at a maximum capacity of the first pump.

3. The diagnostic system of claim 1, wherein the fuel pump module controls activation of the first pump and the second pump, and
wherein the first pump supplies fuel at a lower pressure than the second pump.

4. The diagnostic system of claim 1, further comprising an initialization module that generates an initialization signal when the engine has operated in an idle state for a predetermined period,
wherein the diagnostic control module is enabled to detect the fault based on the initialization signal.

5. The diagnostic system of claim 1, further comprising a fuel control module that generates the commanded pressure signal when the engine is operating in the diagnostic mode,
wherein the fuel control module signals the fuel pump module to deactivate the second pump.

6. The diagnostic system of claim 1, further comprising:
a diagnostic period timer that measures a first time difference between an initial timestamp and a current timestamp of a diagnostic event of the pressure sensor,
wherein the diagnostic period timer increments a diagnostic period timer value based on the first time difference; and
a stabilization period timer that measures a second time difference between an initial timestamp and a current timestamp of a stabilization event of the engine,
wherein the stabilization period timer increments a stabilization period timer value based on the second time difference.

7. The diagnostic system of claim 6, further comprising a pressure detection module that generates the measured pressure signal based on the pressure of the fuel rail,
wherein the pressure detection module is enabled when the stabilization period timer value is greater than a predetermined stabilization period, and
wherein the pressure detection module refrains from detecting the measured pressure signal when the diagnostic period timer value is greater than a predetermined diagnostic period.

8. The diagnostic system of claim 7, wherein the diagnostic control module calculates a plurality of pressure differences between the measured pressure signal and the commanded pressure signal generated during the predetermined diagnostic period,
wherein the diagnostic control module generates an average pressure of the plurality of pressure differences, and
wherein the fault is detected when the average pressure is at least one of less than a first predetermined offset and greater than a second predetermined offset.

9. The diagnostic system of claim 7, wherein the fuel pump module increases an output pressure of the first pump from a first level to a second level based on the commanded pressure signal, and
wherein the fuel pump module decreases the output pressure of the first pump from the second level to the first level when the diagnostic period timer value is greater than the predetermined diagnostic period.

10. The diagnostic system of claim 7, wherein the fuel pump module activates the second pump when the diagnostic period timer value is greater than the predetermined diagnostic period.

11. A method of diagnosing a pressure sensor comprising:
activating a first pump and deactivating a second pump when an engine is operating in a diagnostic mode;
supplying fuel to the second pump via the first pump;
supplying fuel to fuel injectors of the engine via the second pump and using a fuel rail;
receiving a measured pressure signal from the pressure sensor that indicates a pressure of the fuel rail during the diagnostic mode; and
detecting a fault of the pressure sensor based on a comparison between the measured pressure signal and a commanded pressure signal for the first pump.

12. The method of claim 11, wherein the commanded pressure signal is generated at a maximum capacity of the first pump.

13. The method of claim 11, wherein the first pump supplies fuel at a lower pressure than the second pump.

14. The method of claim 11, further comprising:
generating an initialization signal when the engine has operated in an idle state for a predetermined period; and
detecting the fault based on the initialization signal.

15. The method of claim 11, wherein the commanded pressure signal is generated when the engine is operating in the diagnostic mode.

16. The method of claim 11, further comprising:
measuring a first time difference between an initial timestamp and a current timestamp of a diagnostic event of the pressure sensor;
incrementing a diagnostic period timer value based on the first time difference;
measuring a second time difference between an initial timestamp and a current timestamp of a stabilization event of the engine; and
incrementing a stabilization period timer value based on the second time difference.

17. The method of claim 16, further comprising:
generating the measured pressure signal based on the pressure of the fuel rail;
detecting the measured pressure signal when the stabilization period timer value is greater than a predetermined stabilization period; and refraining from detecting the measured pressure signal when the diagnostic period timer value is greater than a predetermined diagnostic period.

18. The method of claim 17, further comprising:

calculating a plurality of pressure differences between the measured pressure signal and the commanded pressure signal generated during the predetermined diagnostic period;

generating an average pressure of the plurality of pressure differences; and detecting the fault when the average pressure is at least one of less than a first predetermined offset and greater than a second predetermined offset.

19. The method of claim 17, further comprising:

increasing an output pressure of the first pump from a first level to a second level based on the commanded pressure signal; and decreasing the output pressure of the first pump from the second level to the first level when the diagnostic period timer value is greater than the predetermined diagnostic period.

20. The method of claim 17, further comprising activating the second pump when the diagnostic period timer value is greater than the predetermined diagnostic period.

* * * * *